United States Patent [19]

Anderson et al.

[11] 4,208,217

[45] Jun. 17, 1980

[54] METHOD OF STABILIZING AQUEOUS FINE COAL SLURRY AND PRODUCT THEREOF

[75] Inventors: John C. Anderson, Hampton Township, Allegheny County; David W. Hutchinson, Hempfield Township, Westmoreland County; Alvin A. Terchick, Monroeville Boro; Wu-wey Wen, Plum Boro, all of Pa.

[73] Assignee: United States Steel Corporation, Pittsburgh, Pa.

[21] Appl. No.: 945,939

[22] Filed: Sep. 25, 1978

[51] Int. Cl.$^2$ .............................................. C04B 31/30
[52] U.S. Cl. ...................................... 106/97; 106/103; 106/286.2
[58] Field of Search ................... 106/90, 97, 103, 118, 106/287

[56] References Cited

U.S. PATENT DOCUMENTS

| 3,870,535 | 3/1975 | Minnick et al. | 106/118 |
| 4,015,997 | 4/1977 | Selmeczi et al. | 106/287 R |

FOREIGN PATENT DOCUMENTS

2522851   9/1976   Fed. Rep. of Germany ........... 106/118

*Primary Examiner*—G. O. Peters
*Attorney, Agent, or Firm*—W. Gary Goodson

[57] ABSTRACT

An aqueous fine coal slurry is stabilized by (a) intimately admixing the aqueous slurry containing between about 30 and about 80 percent fine coal refuse solids by weight with a stabilizing additive comprising Portland cement and (b) allowing the admixture to harden. Preferably the stabilizing additive additionally comprises finely divided blast furnace slag. Also it is preferred that sufficient additive is added so that the slurry will harden to an unconfined compressive strength of at least about 18 psi in less than about two days of addition of the additive.

24 Claims, No Drawings

METHOD OF STABILIZING AQUEOUS FINE COAL SLURRY AND PRODUCT THEREOF

BACKGROUND OF THE INVENTION

This invention relates to a method of treating fine coal refuse usually in the form of an aqueous slurry in order to be able to dispose of the refuse and water in a safe and economical manner.

One of the major problems in modern coal mining and cleaning is the safe and economical disposal of fine refuse, which usually has a size of less than about 28 mesh (and more commonly less than about 48 mesh). A large portion of this refuse is mineral matter and thus the refuse has poor fuel value.

Up until recently, this material has been disposed of by one of several methods. Pumping of an aqueous slurry of the refuse behind a permanent impoundment was commonly used. Construction costs were minimized by using coarse coal refuse to build the impoundment or dam. Operating costs were very low. However, this method as commonly practiced was found to be very unsafe. For this reason, state and federal regulations now provide stringent rules governing construction of impoundments. Thus, today this method is a very expensive disposal method.

Another proposed disposal method has been to dig small ponds into which the refuse slurry is dumped. The solids settle to the bottom and the water is pumped off. When the pond is full, it must then be excavated and hauled off for permanent disposal. The common method is to haul the excavated material to the coarse refuse dump and mix the two materials together. However, digging and handling characteristics of the settled fine coal refuse are generally very bad. This results in a very inefficient, messy and expensive disposal method.

Another proposed method is mechanical dewatering, either by vacuum filters, pressure filters or centrifuges, in place of gravity dewatering of the holding ponds. While water content of the filter or centrifuge cakes is usually lower than the pond-settled solids, few installations can produce cakes with satisfactory handling and disposal characteristics. The disposal problems and economics are thus very similar to those in the temporary ponding procedure.

A method that has been developed recently is the addition of a stabilizing additive to the fine coal refuse slurry to cause solidification. Lime alone or lime and blast furnace slag are stabilizing additives that have been used for this purpose. See U.S. Pat. No. 4,015,997, which is incorporated herein by reference. These stabilization methods have improved the stability of the fine coal refuse, thereby enabling improved and more efficient handling of the stabilized fine coal refuse. However, when the slurry to which the additive has been added is placed in a settling pond, very long time periods such as several days to two or three weeks are often required to reach a suitable stability. This requires very large settling ponds which increase expense.

Also the possibility of combining dewatered fine coal refuse with the additive and transporting directly to the land fill has been suggested. This would eliminate the need for a settling pond. However, to date this has not proven to be commercially successful.

U.S. Pat. No. 3,870,535 suggests the use of lime alone or lime and fly ash as an additive to a combined coarse and fine refuse. While reduced setting times have been achieved with the coarser material, there is no suggestion that use of these additives for fine coal refuse alone would improve the stabilization rate.

BRIEF DESCRIPTION OF THE INVENTION

An aqueous fine coal refuse slurry is treated by (a) intimately admixing to the slurry containing between about 30 percent and 80 percent solids by weight with a stabilizing additive comprising Portland cement and (b) allowing the admixture to harden. Preferably the stabilizing additive additionally comprises finely divided blast furnace slag. Also it is preferred to add sufficient additive in order that the slurry will harden to an unconfined compressive strength of at least about 18 psi in less than about 2 days of standing. In general the additive is added in the amount of between about 2 and about 100 parts by weight per 100 parts by weight of dry, fine coal refuse.

For a given refuse slurry, a much improved rate of stabilization has been achieved while using the stabilizing additive of this invention compared to other additives taught in the prior art for this purpose. This benefit can result in the need for smaller quantities of additives, smaller settling ponds, or a combination of these results. Also by using the additives of this invention in the method whereby the fine refuse slurry is added directly to the coarse coal refuse to thereby eliminate the need for settling ponds, success can be accomplished much more easily and economically.

DETAILED DESCRIPTION

The aqueous slurry of fine coal refuse contains between about 30 and about 80 weight percent of solids. Commonly the aqueous slurry initially contains between about 30 and about 40 weight percent solids. It is then dewatered by means of a centrifuge, vacuum filtration, pressure filtration, or the like until the percent solids has been increased from about 45 to about 80 weight percent solids and often between about 50 and about 70 percent solids. The Portland cement useful in this invention is the well known hydraulic cement material generally containing compounds of lime, alumina, silica and iron oxide. Five different types of Portland cement are defined by ASTM. Type I is especially preferred for the subject invention because of the exceptionally good results obtained. Common compounds found in Portland cement are tetracalciumaluminoferrate (4 $CaO.Al_2O_3.Fe_2O_3$), tricalcium aluminate (3 $CaO.Al_2O_3$), tricalcium silicate (3 $CaO.SiO_2$), and dicalcium silicate (2 $CaO.SiO_2$). Small amounts of magnesia, sodium, potassium and sulfur are usually also present in combined form. Portland cement is generally made by heating a mixture of clay and limestone to incipient fusion and then grinding the clinker to a fine powder.

The stabilizing additive may contain in addition to Portland cement other materials such as blast furnace slag, fly ash, or lime. The lime may be in the form of cement baghouse dust. Finely divided blast furnace slag and especially finely divided granulated blast furnace slag are particularly preferred. The slag preferably has a particle size of less than about 200 mesh and more preferably less than about 325 mesh. It is preferred that between about 15 percent and about 90 percent of the slag be less than 325 mesh in size. More preferably between about 60 percent and 90 percent of the slag will have a particle size of less than about 325 mesh. The stabilizing additive is added to the refuse slurry in an amount sufficient to obtain the desired stabilizing action on the slurry. A preferred range is between about 2 parts to about 100 parts by weight of additive to 100 parts by weight of total dry components of the refuse slurry. More preferably the additive is added in an amount of between about 10 parts and about 50 parts by weight of the total dry components.

In the preferred embodiment wherein the stabilizing additive contains both Portland cement and blast furnace slag it is preferred that the additive has a composition of from about 70 to about 90 parts by weight of blast furnace slag and from about 10 to about 30 parts by weight of Portland cement. More preferably the additive contains from about 85 to about 90 parts by weight of blast furnace slag and between about 10 to about 15 parts by weight of Portland cement.

The stabilized slurry preferably hardens to an unconfined compressive strength of at least about 18 psi in less than about two days from addition of the additive to the slurry. This will vary somewhat depending upon the fineness of the fine refuse.

The unconfined compressive strength is measured using the "Standard Test Methods for Unconfined Compressive Strength of Cohesive Soil", ASTM Designation D2166–66 from the 1977 ASTM Standard Book. Another way of measuring strength is the Penetration Index. The Penetration Index test is based on the "Standard Method Test for Penetration of Bituminous Materials" from the 1974 ASTM Standard Book. This Penetration Index is readily correlated with the uncombined compressive strength by the following equations:

| | |
|---|---|
| $Pc = 0.889\ Ip$ (for 80% $-325$ mesh) | (this will vary somewhat depending upon the fineness of the fine refuse) |

$Ip = 20(W/p)$, wherein

Pc = Unconfined Compressive Strength in pounds per square inch (psi)
Ip = Penetration Strength Index
W = Total weight of the needle and plunger of penetrometer and extra weight, if any, added to the plunger
P = Average penetration of tip of needle, in 0.1 millimeters (mm)

The following examples are given by way of illustration and are not intended to limit the invention.

EXAMPLES 1–18

A fine coal refuse slurry is obtained from a United States Steel Corporation coal preparation plant. The refuse has a particle size of minus-48-mesh (300 μm). The aqueous refuse slurry contains about 40 percent solids, which is substantially 100 percent minus 48 mesh. This material has an ash content ranging from 40 to 50 percent and contains about 80 percent minus 325 mesh (45 μm) material.

The coal refuse of the slurry contains about 51 percent ash and has an energy content of about 6,612 Btu per pound ($1.538 \times 10^4$ KJ/kg).

Approximately 400 ml of slurry refuse was placed in a 16-ounce (473.1 ml) bottle. Various cement additives were then added and mixed with the slurry. The mixed slurry was allowed to set at various temperatures and the setting characteristics were monitored with a penetrometer. The penetrometer is a weighted needle that is dropped onto the surface of the set slurry. The deeper the penetration of the needle, the lower the index number. The penetrometer and the procedure are that in ASTM procedure D5-73.

Table I lists the testing conditions and penetration strength index after 21 days of setting at room temperature (72° F.) (22.2° C.). The granulated slag used for these tests was ground to minus 200 mesh (75 μm) in a laboratory pulverizer.

In Examples 1 through 6, the cementing effects of ground blast-furnace slag alone on the slurry were determined.

Examples 7 through 12 evaluated the cementing effects of ground, granulated blast-furnace slag mixed with hydrated lime on the slurry.

The cementing effects of the ground slag and Portland Cement Type IS were determined in tests 13 through 18. Portland Cement Type IS is composed of 60 percent by weight Portland Cement Type I and 40 percent by weight granulated blast-furnace slag.

All three additives had solidified the refuse slurry to permit penetration readings after 21 days of setting. The penetration strength index of the slag and slurry mixture increased as the amount of additives was increased. The penetration strength index of the mixture of slag plus Portland Type IS cement increased as the additive was increased and as the amount of Portland Type IS cement was increased in the additive (Table IV). The penetration index of the slag-plus-lime additive did not increase as the amount of additive was increased or as the amount of lime was increased. These examples represent some of the very first tests conducted and lacked some of the careful testing procedures used in later examples, such as putting air-tight lids on the bottles while they are stabilizing to prevent atmospheric moisture from affecting the results. Thus they are rough indications of the results, but there is some question about the comparison between Examples 7 and 8 and 13 and 14.

Table I

| | Stabilization Tests on Coal-Refuse Slurry (40% Solids) | | | | |
|---|---|---|---|---|---|
| Example No. | Total lb of Additive Per 100 lb of Refuse Solids | Lb of Slag Per 100 lb of Refuse Solids | Lb of Portland Cement Type IS* Per 100 lb of Refuse Solids | Lb of Hydrated Lime Per 100 lb of Refuse Solids | Penetration Strength Index 21 Days Setting |
| 1 | 0 | 0 | — | — | — |
| 2 | 5 | 5 | — | — | — |
| 3 | 10 | 10 | — | — | 9 |
| 4 | 15 | 15 | — | — | 26 |
| 5 | 20 | 20 | — | — | 40 |
| 6 | 25 | 25 | — | — | 37 |
| 7 | 21.5 | 20 | — | 1.5 | 46 |
| 8 | 23.0 | 20 | — | 3.0 | 48 |
| 9 | 24.5 | 20 | — | 4.5 | 26 |
| 10 | 30.0 | 20 | — | 10.0 | 32 |
| 11 | 40.0 | 20 | — | 20.0 | 33 |

Table I-continued

Stabilization Tests on Coal-Refuse Slurry (40% Solids)

| Example No. | Total lb of Additive Per 100 lb of Refuse Solids | Lb of Slag Per 100 lb of Refuse Solids | Lb of Portland Cement Type IS* Per 100 lb of Refuse Solids | Lb of Hydrated Lime Per 100 lb of Refuse Solids | Penetration Strength Index 21 Days Setting |
| --- | --- | --- | --- | --- | --- |
| 12 | 50.0 | 20 | — | 30.0 | 44 |
| 13 | 21.5 | 20 | 1.5 | — | 24 |
| 14 | 23.0 | 20 | 3.0 | — | 39 |
| 15 | 24.5 | 20 | 4.5 | — | 83 |
| 16 | 30.0 | 20 | 10.0 | — | 143 |
| 17 | 40.0 | 20 | 20.0 | — | 333 |
| 18 | 50.0 | 20 | 30.0 | — | 500 |

Setting temperature: 72° F. (22.2° C.)
*Type IS Cement is 40% granulated blast furnace slag and 60% Portland Type I Cement

EXAMPLES 19–22

The procedure of Examples 1–18 was followed as to Examples 20 and 22 except indicated below. The granulated slag used with these additives was ground to about 90 percent minus 325 mesh (45 μm) in a laboratory jar mill. The amount of additives used is indicated as additive-to-refuse ratio. For example, a ratio of 10/100 means 10 parts by weight of additive to 100 parts by weight of refuse-slurry solids by weight.

The ratio of additives-to-refuse solids tested were 5/100 and 10/100. The additives were tested with a 60 percent solids slurry. Table II presents the experimental data. The data for Examples 19 and 21 was taken from U.S. Pat. No. 4,015,997.

The slag-Portland cement additive was composed of 85 weight percent granulated blast furnace slag and 15 weight percent of Portland cement Type I. The slag-lime additive was composed of 97 weight percent granulated blast furnace slag and 3 weight percent lime.

Results tabulated in Table II indicate that at 10/100 and 5/100 ratio of additive to refuse solid ratio, the slag Portland cement additive stabilized the slurry refuse to a handable strength (1.3 t/ft$^2$ or 20 penetration strength index) at 1 and 3 days, while for the slag-lime additive, 10 and 19 days.

In two weeks of setting at 10/100 ratio of additive to slurry refuse, the slag-Portland cement slurry refuse reached an unconfined compressive strength of 8.0 t/ft$^2$ while for slag and lime slurry refuse, 3.7 t/ft$^2$.

It is therefore concluded that the slag-Portland cement additive gives an earlier strength and also a better setting strength than the slag-lime additive.

EXAMPLES 24–32

The procedure of Examples 1–19 was followed except as noted below. The fine coal refuse slurry was from United States Steel Corporation's Maple Creek, Pennsylvania Plant. It contained 50 percent by weight of solids. The additive to refuse solids ratio was 10 parts by weight to 100 parts by weight. The composition of the stabilizing additives tested and the results are given in Table III, below:

TABLE III

| Example No. | Fly Ash* In Additive (Wt. %) | Lime in Additive (Wt. %) | Blast Furnace Slag in Additive (Wt. %) | Portland Type I In Additive (Wt. %) | Penetration Strength Index 61 Days |
|---|---|---|---|---|---|
| 24 | 100 | 0 | | 0 | ** |
| 25 | 95 | 5 | | 0 | ** |
| 26 | 90 | 10 | | 0 | ** |
| 27 | 85 | 15 | | 0 | ** |
| 28 | 80 | 20 | | 0 | ** |
| 29 | 75 | 25 | | 0 | ** |
| 30 | 85 | 0 | | 15 | 4.5 |
| 31 | 0 | 0 | 85 | 15 | 123.0 |
| 32 | 85 | 5 | | 10 | 3.9 |

*Fly Ash 81% minus 325 mesh
**Not measurable

The Conclusions were as follows:

1. At a 50% solids refuse-slurry, a 10/100 additive refuse ratio is too low for most practical applications.

2. Fly ash with Portland Type I cement is better than fly ash with lime, in terms of setting up rapidly after additive addition.

EXAMPLES 33–40

These examples follow the procedure and use the compositions of Examples 1–19, except as noted below. A Maple Creek, Pennsylvania Plant, fine coal refuse having a 60 weight percent solids was used. The additive to refuse solids was 10 parts by weight to 100 parts by weight. The additive compositions and results are given Table IV, below:

TABLE II

STRENGTH PER DAY OF SETTING T/FT$^2$

| Example No. | Additive | COAL SLURRY REFUSE Mine | % Solid | Additive-to-Refuse Ratio | 1 | 2 | 5 | 6 | 7 | 8 | 9 | 11 | 12 | 13 | 14 | 15 | 16 | 17 | 19 | 20 | 21 | 23 | 25 | 26 |
|---|---|---|---|---|---|---|---|---|---|---|---|---|---|---|---|---|---|---|---|---|---|---|---|---|
| 19 | Slag and Lime | Mathias**** | 60 | 5/100 | — | — | — | N* | N* | N* | — | N* | N* | N* | — | N* | — | N* | N* | 3.5** | — | — | 4.5** | — |
| 20 | Slag and Portland Cement | Maple Creek***** | 60 | 5/100 | 0.69*** | 1.22 | 1.96 | 2.05 | 2.18 | 2.18 | 2.16 | — | 3.69 | 2.75 | 3.69 | 4.25 | 3.26 | 4.5 | 4.16 | — | 3.65 | 5.05 | — | 2.84 |
| 21 | Slag and Lime | Mathias | 60 | 10/100 | — | — | — | N* | N* | 0.25 | — | — | — | — | — | — | — | — | 4.5** | 4.5** | — | — | 4.5** | — |
| 22 | Slag and Portland Cement | Maple Creek | 60 | 10/100 | 1.18 | 1.94 | 3.56 | 5.34 | 4.18 | 4.47 | 5.82 | 7.39 | — | — | 8.00 | — | 8.26 | — | 9.28 | — | 10.88 | 11.52 | — | 12.53 |

*N means not measurable.
**Result of soil test penetrometer Model CL 700, USP 4,015,997, April 5, 1977.
***Result of unconfined compression test.
****31.9% Ash; 48% minus 200 mesh; 98% minus 20 mesh.
*****50.6% Ash; 89.4% minus 200 mesh; 99.7% minus 28 mesh.

TABLE IV

| Example No. | Blast Furnace Slag Additive (Wt. %) | Portland Type I In Additive (Wt. %) | Lime in Additive (Wt. %) | Fly Ash Additive (Wt. %) | Days to Reach a Penetration Strength Index of 20 |
|---|---|---|---|---|---|
| 33 | 85* | 15 | | | 1 |
| 34 | 85** | 15 | | | 1 |
| 35 | 40 | 60 | | | 1 |
| 36 | | 100 | | | 1 |
| 37 | 85*** | 15 | | | 9 |
| 38 | | | 100 | | 21 |
| 39 | | 15 | | 85 | at 29 days had reached an index of 15 |
| 40 | | | | 100 | at 29 days still had not achieved a measurable index number |

*granulated slag
**pelletized slag
***air-cooled slag

These Examples show the advantage of using Portland Cement as an additive compared to lime or fly ash. It should be noted the improvement in fly ash as an additive by adding a small amount of Portland Cement (compare Examples 39 and 40). It should particularly be noted that the Portland Cement additives of Examples 33–36 achieved the desired penetration index no. of 20 within the first day. This was achieved with an additive to refuse solids ratio of only 10 to 100. This means that small settling ponds can be utilized and that the amount of additive is sufficiently small to make the costs reasonable. If desired, it also would be possible to mix the additive containing slurries of Examples 33–36 directly with the coarse refuse, thereby eliminating the need for settling ponds—and all the related expense and problems associated with them.

We claim:

1. Method of stabilizing an aqueous slurry of fine coal refuse having a size of less than about 28 mesh comprising (a) intimately admixing said aqueous slurry of said refuse containing between about 30 percent and about 80 percent of solids by weight with a stabilizing additive comprising Portland cement and (b) allowing the admixture to harden.

2. Method as in claim 1 wherein the stabilizing additive additionally comprises finely divided blast furnace slag.

3. Method as in claim 1 wherein the stabilizing additive additionally comprises a finely divided pozzolonically active material.

4. Method as in claim 1 wherein the stabilizing additive additionally comprises fly ash.

5. Method as in claim 1 wherein the ratio of stabilizing additive added to the refuse slurry is between about 2 and about 100 parts by weight of additive per 100 parts by weight of total dry components of the refuse slurry.

6. Method of stabilizing an aqueous slurry of fine coal refuse comprising (a) intimately admixing said aqueous slurry of said refuse containing between about 30 percent and about 80 percent fine coal solids by weight with a stabilizing additive comprising Portland cement, and (b) allowing the admixture to harden, wherein the fine coal refuse has a particle size less than about 28 mesh, and wherein the aqueous slurry contains between about 30 percent and about 80 percent solids by weight, said stabilizing additive being added in amounts sufficient to cause the refuse slurry to harden to an unconfined compressive strength in less than about 2 days standing.

7. Method as in claim 6 wherein the additive is added in an amount between about 2 and about 100 parts by weight per 100 parts of total dry components of the refuse slurry by weight.

8. Method as in claim 6 wherein the stabilizing aqueous slurry contains between about 45 percent and about 80 percent fine coal solids by weight and wherein the additive is added in an amount between about 10 parts and about 50 parts by weight of total dry components of the refuse slurry by weight.

9. Method as in claim 8 wherein the aqueous slurry contains between about 50 percent and about 70 percent solids and is obtained by centrifuging an aqueous slurry containing between about 30 percent and about 40 percent fine coal solids.

10. Method as in claim 9 wherein the additive also comprises granulated blast furnace slag having a particle diameter less than about 200 mesh.

11. Method as in claim 10 wherein the blast furnace slag is between about 15 percent and about 90 percent by weight of material having a particle size less than about 325 mesh.

12. Method as in claim 11 wherein between about 60 percent and about 90 percent of the blast furnace slag has a particle size less than about 325 mesh.

13. Method as in claim 6 wherein the aqueous slurry contains between about 55 percent and about 70 percent solids and was obtained by use of a centrifuge and wherein a flocculant was added to the aqueous slurry being treated by the centrifuge.

14. Method of stabilizing an aqueous slurry of fine coal refuse comprising (a) intimately admixing said aqueous slurry of said refuse containing between about 30 percent and about 80 percent fine coal solids by weight with a stabilizing additive comprising Portland cement and granulated blast furnace slag and (b) allowing the admixture to harden.

15. Method as in claim 14 wherein the fine coal refuse has a particle size substantially less than about 28 mesh.

16. Method as in claim 15 wherein the ratio of stabilizing additive added to the refuse slurry is between about 2 parts to about 100 parts by weight of additive to 100 parts by weight of total dry components of refuse slurry.

17. Method as in claim 16 wherein the stabilizing additive has a composition of from about 70 to about 90 parts by weight of blast furnace slag and from between about 10 to about 30 parts by weight of Portland cement.

18. Method as in claim 16 wherein the stabilizing additive has the following composition from about 85 to about 90 parts by weight of blast furnace slag to between about 10 to about 15 parts by weight of Portland cement and wherein the additive added to the refuse slurry is between about 5 and about 20 parts by weight of additive per 100 parts by weight of total dry components of the refuse slurry.

19. Product comprising a solidified fine coal refuse composition comprising the reaction product of (a) an aqueous slurry of said refuse having a size of less than about 28 mesh and containing between about 30 percent and about 80 percent fine coal refuse solids by weight and (b) a stabilizing additive comprising Portland cement.

20. Product as in claim 19 wherein the stabilizing additive additionally comprises finely divided granulated blast furnace slag.

21. Product as in claim 20 wherein the solidified composition has an unconfined compressive strength of at least around 18.

22. Product as in claim 20 wherein between about 60 percent and about 90 percent of the blast furnace slag has a particle size less than about 325 mesh and wherein the stabilizing additive is composed of from about 85 to about 90 parts by weight of blast furnace slag to between about 10 to about 15 parts by weight of Portland cement and wherein the additive is present in an amount between about 5 and about 20 parts by weight of additive per 100 parts by weight of total dry components of the refuse slurry.

23. Product as in claim 19 additionally comprising coarse coal refuse mixed in with the fine coal refuse.

24. Product as in claim 23 wherein the fine coal refuse and coarse coal refuse are substantially uniformly mixed.

* * * * *